United States Patent [19]

Barnett

[11] 4,359,401

[45] Nov. 16, 1982

[54] METHOD OF REGENERATION OF AN IRON PHOSPHATE-TYPE CATALYST

[75] Inventor: Kenneth W. Barnett, Worthington, Ohio

[73] Assignee: Ashland Oil, Inc., Ashland, Ky.

[21] Appl. No.: 228,303

[22] Filed: Jan. 26, 1981

[51] Int. Cl.$^3$ .................. B01J 27/28; B01J 27/18; C07C 51/377; C07C 57/05

[52] U.S. Cl. .................. 252/416; 252/420; 252/435; 562/599

[58] Field of Search .................. 252/416, 411 R, 420, 252/414; 562/599

[56] References Cited

U.S. PATENT DOCUMENTS

| | | | |
|---|---|---|---|
| 3,315,006 | 4/1967 | Alexander et al. | 585/622 |
| 3,398,100 | 8/1968 | Christman | 252/435 |
| 3,634,494 | 1/1972 | Tsu | 560/214 |
| 3,948,959 | 4/1976 | Cavaterra et al. | 568/397 |
| 4,010,114 | 3/1977 | Walker et al. | 252/437 |
| 4,176,234 | 11/1979 | Grasselli | 252/435 |

*Primary Examiner*—P. E. Konopka
*Attorney, Agent, or Firm*—Wood, Herron & Evans

[57] ABSTRACT

A method of regenerating an iron/phosphate-type catalyst typically used for the oxydehydrogenation of lower molecular weight carboncylic acids comprising the step of subjecting the catalyst to an oxidizing atmosphere, preferably by discontinuing the flow of organic feed through the catalyst bed, followed by the step of subjecting the catalyst to a reducing atmosphere, preferably injecting organic feed in the absence of oxygen over the catalyst. The method is specifically described with respect to the production of methacrylic acid by the oxydehydrogenation of isobutyric acid.

6 Claims, No Drawings

METHOD OF REGENERATION OF AN IRON PHOSPHATE-TYPE CATALYST

BACKGROUND OF THE INVENTION

This invention relates to the regeneration of a catalyst comprising iron, phosphorus, oxygen and possibly one or more other elements such as the alkali or alkaline earth metals, which is preferably used in the oxydehydrogenation of isobutyric acid to form methacrylic acid.

These catalysts commonly referred to as iron/phosphate catalysts are well known as mild oxydizing catalysts. The production and use of catalysts of this type is disclosed in Cavaterra, U.S. Pat. No. 3,948,959. Primarily, the catalyst contains iron, phosphorus and oxygen. The iron in the catalyst is a mixture of $Fe^{++}$ and $Fe^{+++}$. During use, typically to oxydehydrogenate a lower molecular weight organic compound such as isobutyric acid, the iron in the plus 3 state is reduced to iron in a plus 2 state. This causes a deactivation of the catalyst. Over a long period of use, the catalyst tends to be less effective both in terms of conversion rate and selectivity.

A typical solution to this problem has been to cut off the feed of organic material into and through the catalyst bed and to maintain the flow of steam and air or steam and oxygen at or above operating conditions over a period of time. This tends to return much of the $Fe^{++}$ to $Fe^{+++}$. However, not all of the iron does change to $Fe^{+++}$. This is critical in that the catalyst seems to require iron in both states in order to function properly. However, of course, as this oxidizing reaction is once again resumed, the $Fe^{+++}$ is reduced to $Fe^{++}$ and the catalyst again slowly deactivates.

It has been found quite unexpectedly, and contrary to the theory behind the iron phosphorus catalyst, that the catalyst can be regenerated to a higher state of efficiency by first discontinuing the flow of organic feed material and continuing the steam-air or steam-oxygen flow, thereby creating an oxidizing atmosphere, and subsequently changing the atmosphere in the reactor bed to a mild reducing atmosphere, preferably by introducing only organic feed and steam in the absence of air or oxygen for a period of time. This two step procedure has been found to significantly improve the efficiency of the catalyst, especially in view of the prior art.

DETAILED DESCRIPTION OF THE INVENTION

Iron/phosphate catalysts are well known and generally comprise a mixture of iron and phosphorus in the form of a phosphate moiety, and optionally one or more of the following elements: lithium, sodium, potassium, rubidium, cesium, magnesium, calcium, strontium, or barium. The proportion of the elements in the catalyst of the present invention can be expressed by the following formula: $FeP_xMe_yO_z$ in which Me is one or more of the following elements: Li, Na, K, Rb, Cs, Mg, Ca, Sr, or Ba. X is 0.2 to 2.0 and, preferably, 0.8 to 1.4. Y is 0.0 to 2, and Z has a value sufficient to compensate the average valences of the elements in the oxidation states which exist in the catalyst.

It is conventional when identifying the catalyst by empirical formula to consider the elements as existing as oxides. However, as is understood by those skilled in the art, to assign a value to a symbol such as Z in the foregoing formula to the catalyst is not to say that all of the elements making up the catalyst do exist as oxides wholly or partially since the actual oxidation states of the element as they exist in the catalyst has not been established.

For this invention, the following salts are suitable for sources of iron: nitrates, halides, sulphates, carbonates, salts of monocarboxylic and polycarboxylic organic acids and oxides.

Sources of phosphorus include alkyl phosphates, ammonium phosphates, phosphoric acid, phosphoric acid being the preferred source of phosphorus.

As starting materials for the preparation of this catalyst, according to this invention, the following sources of alkali or alkaline earth metals, for example, may be used: nitrates, oxides, hydroxides, carbonates, bicarbonates, nitriles, phosphates, silicates, and oxyacid salts of monocarboxylic or polycarboxylic acids such as formates, oxylates, citrates, tartrates, etc.

The catalyst can be prepared by dissolving a suitable quantity of one of the above-listed iron salts in a solvent, preferably water. Phosphorus in the form of an acid or dissolved salt solution is mixed with the iron solution. The pH of the solution is adjusted to 7 or higher by the addition of a base, preferably ammonium hydroxide, causing a yellow precipate to form. The precipitate is the raw iron/phosphate catalyst. This precipitate is washed by decanting with water until the decanting wash contains no dissolved solids. The washed catalyst is dried by gently heating at a temperature of approximately 50° C.

If alkali or alkaline earth metals are desired in these catalysts, the salts of these metals are dissolved in this slurried precipitate during the above heating. This final mixture is heated at approximately 120° C. to dryness.

An alternate method of preparing a catalyst is disclosed in Cavaterra which calls for addition of the alkali or alkaline earth metal to the iron phosphorus solution prior to the neutralization. The remaining steps are not altered. It is believed that adding the alkali or alkaline earth metals prior to the neutralization step and prior to heating causes the catalyst to be more homogeneous. However, either method will work in the present invention.

This dry catalyst is crushed to a desired fineness and calcined at a temperature of 400°-800° C. for approximately 15 hours. The above steps are well known to those skilled in the art. In addition, other iron/phosphate catalysts employing tin, lead or other elements are also known and are included within the limits of this application.

Iron/phosphate catalysts of this type are typically used as mild oxidizing catalysts and more particularly, are used in the oxidative dehydrogenation of lower molecular weight carboxylic acids. In the preferred embodiment of this invention, these catalysts are used in the oxydehydrogenation of isobutyric acid to form methacrylic acid. In this case, the isobutyric acid in a gaseous state, mixed with oxygen from the air and with one or more diluents such as nitrogen, steam or carbon dioxide is caused to contact the catalyst.

The catalyst of this invention can be employed in various types of reactors and catalyst beds to dehydrogenate saturated lower molecular weight carboxylic acids. When the reaction is conducted using a fixed catalyst bed which is preferred, this bed may be prepared by arranging the catalyst inside the tubes of a tube bundle reactor and maintaining the reaction temperature between 300° C. to 550° C. and preferably, 340° C. to 500° C.

The contact time expressed in seconds as the ratio between the volume of the catalyst bed and the volume of the feed of the mixture of reagents per second, measured under the average conditions of temperature and pressure existing in the bed may be varied depending upon the nature of the catalyst, the nature of the catalyst bed, and the catalyst size. However, generally the contact time will be from 0.1 to 20 seconds and preferably 0.3 to 15 seconds.

As the reaction is conducted over a period of time, the maximum conversion and selectivity should be determined by analysis of the products. By monitoring the percent conversion and percent selectivity, the efficiency of the catalyst is monitored and also the optimum conversion and selectivity can be determined.

As this reaction is conducted over a period of time, the percent conversion and percent selectivity will decrease due to deactivation of the catalyst. Once it is determined that the catalyst is deactivated to a state in which it is no longer desirable to continue the reaction, the flow or organic material is discontinued and the diluent, which is preferably steam and air, is continued to be admitted into the reactor. The reactor temperature should still be maintained between 400° C. and 500° C. This should be continued for 2 to 15 hours depending upon the size of the reactor and the degree of deactivation. The amount of steam appears to be important in this step. Preferably, 20–40 mole percent of steam should be admitted. A steam content above 50 mole percent is deleterious to the regeneration. The remaining feed should be an oxygen-rich atmosphere. Approximately 50 mole percent oxygen should be admitted. The remaining feed is inert material such as nitrogen from the atmosphere.

After this oxidation step has been completed, a gaseous feed consisting of a reducing compound or mixture is passed through the catalyst bed. Preferably, this is accomplished by simply discontinuing the oxygen flow, and continuing the flow of steam and beginning the flow of organic reactants. This is continued for approximately 1–2 hours although optimum conditions for both the oxidation and the reduction step can vary depending on the size of the reactor, the length of time the reactor has been in use, the temperature conditions of the reaction of the oxidation step and the reduction step and the particular catalyst contained in the reactor. Therefore, it becomes necessary for each operator to determine the optimum conditions for the regeneration of the particular catalyst for the particular reactor by comparing the percent conversion and the percent selectivity of the reactants after the regeneration has occurred with the data observed when the catalyst was fresh.

For purposes of comparing prior art catalysts and for the purpose of describing the preferred embodiment of the present invention, the use and regeneration of an iron/phosphate type catalyst for the oxidative dehydrogenation of isobutyric acid will be described. The reaction is a vapor phase reaction conducted in a tubular reactor with a fixed bed catalyst. The reactants comprise isobutyric acid (IBA) oxygen in the form of air and preferably steam as a diluent. The reactants should comprise 0.5 to 10 mole percent IBA, 0.5 to 20 mole percent oxygen (in the form of air), and 1 to 40 mole percent water. The preferred reactant mixture is 5 mole percent IBA; 3.75 mole percent oxygen in the form of air and 75 mole percent water. These reactants are admitted into the catalyst bed which is maintained at a heat of 400° C. The contact time should be between 0.1 to 10 and preferably, 0.5 to 1.5 seconds.

EXAMPLE

A catalyst comprising iron, phosphorus, cesium, and oxygen was formed by the above-described method with an iron/phosphorus/cesium ratio of 1 to 1.11 to 0.127. This was placed in a tubular reactor. Feed comprising 4 mole percent isobutyric acid, 3.7 mole percent oxygen, 72.8 mole percent water in the form of steam, and 19.5 mole percent nitrogen diluent was passed over the catalyst at 400° C. with contact time of 0.44 seconds. This was continued for over 1000 hours, at which time the IBA conversion was 82%, MAA selectivity 67%, and MAA yield 55%. A first section of the catalyst bed was regenerated by injecting air at the rate of 100 ml. per minute and water at the rate of 2.5 mls. per hour at a temperature of 400° C. for eight hours. The IBA, steam, and oxygen mixture was again injected into the reactor as before and the percentage conversion of IBA, percent selectivity, and yield of methacrylic acid were determined over a period of time. The results are recorded in Table A. These results are a demonstration of the prior art method of regeneration.

This catalyst was again regenerated at 400° C. by flowing air at the rate of 75 mls. per minute and oxygen at the rate of 25 mls. per minute and water at the rate of 2.4 mls. per hour for seven hours. The flow of air and oxygen was discontinued for a period of approximately one hour, during which only isobutyric acid and steam were injected through the reactor bed. The flow of oxygen was then started again and the percentage IBA conversion and percent methacrylic acid selectivity as well as the methacrylic acid yield were measured over a period of time. Table B contains the results of these studies. This two step method of subjecting the spent catalyst to an oxidative atmosphere and subsequently to a reducing atmosphere constitutes the present invention.

A second section of the used catalyst bed was regenerated according to the method of the present invention. The results are listed in Table C. Section I of Table C represents the results obtained by use of the catalyst before regeneration. Section II represents the results obtained from the catalyst after the catalyst was regenerated by flowing air at the rate of 75 mls. per minute, oxygen at 25 mls, per minute, and water at the rate of 2.5 mls. per hour at 450° for 15 hours followed by flowing isobutyric acid at the rate of 2.5 mls. per hour and water at the rate of 9.7 mls. per hour with no air for one hour at 400° C. Section III contains the data observed after the preceding oxidizing and reducing steps were repeated.

The data shown in Table A demonstrate that regenerating the catalyst using an oxidative atmosphere improves catalyst efficiency somewhat. As shown in Tables B and C, the successive applications of oxidizing and reducing atmospheres improves catalyst activity significantly. Furthermore, the data of Table C demonstrate that repetition of the oxidizing/reducing regeneration cycle leads to yet further improvement. It should be noted that the improved results do not appear immediately, but only after the catalyst has been subjected to reaction conditions for a period or time.

TABLE A

| Time | Conv. IBA (%) | Select. MAA (%) | Yield MAA (%) |
| --- | --- | --- | --- |
| Before Regeneration[1] | 82.886 | 67.013 | 55.554 |
| 30 min. | 77.457 | 63.730 | 49.364 |
| 2.0 hours | 79.096 | 63.768 | 50.438 |
| 3.5 hours | 79.751 | 65.925 | 42.575 |
| 5.7 hours | 80.110 | 56.491 | 45.255 |
| 7.2 hours | 78.779 | 63.393 | 49.941 |
| 8.7 hours | 81.409 | 67.899 | 55.032 |
| 9.2 hours | 83.412 | 71.874 | 59.952 |

[1] These represent results using this catalyst prior to regeneration.

TABLE B

| Time | Conv. IBA (%) | Select. MAA (%) | Yield MAA (%) |
| --- | --- | --- | --- |
| 3.3 hours | 80.759 | 64.386 | 51.998 |
| 4.8 hours | 85.398 | 68.222 | 58.260 |
| 6.3 hours | 87.387 | 67.800 | 59.248 |
| 7.8 hours | 88.225 | 69.862 | 61.636 |
| 9.8 hours | 88.440 | 70.421 | 62.281 |
| 11.3 hours | 90.486 | 72.996 | 66.052 |
| 12.8 hours | 90.829 | 73.583 | 66.835 |
| 14.3 hours | 88.700 | 73.632 | 65.312 |
| 16.5 hours | 90.255 | 77.852 | 70.265 |
| 18.6 hours | 94.904 | 71.781 | 68.123 |
| 20.1 hours | 93.761 | 74.948 | 70.273 |
| 21.6 hours | 93.223 | 73.364 | 68.392 |
| 22.5 hours | 91.284 | 64.032 | 58.451 |
| 24.0 hours | 90.508 | 71.778 | 64.965 |
| 25.5 hours | 85.259 | 81.641 | 69.606 |
| 27.0 hours | 93.316 | 72.436 | 67.595 |
| 28.5 hours | 90.149 | 72.051 | 64.953 |

TABLE C

| | Cum. Time | Conv. IBA (%) | Select. MAA (%) | Yield MAA (%) |
| --- | --- | --- | --- | --- |
| I. | 2.5 hours | 82.999 | 58.639 | 48.669 |
| | 4.0 hours | 81.479 | 60.664 | 49.428 |
| | 5.5 hours | 82.677 | 64.436 | 53.273 |
| II. | 9.0 hours | 89.610 | 56.901 | 50.989 |
| | 10.5 hours | 89.341 | 66.598 | 59.499 |
| | 13.5 hours | 89.635 | 63.436 | 56.861 |
| | 15.0 hours | 89.614 | 65.961 | 59.110 |
| | 16.5 hours | 88.077 | 71.972 | 63.391 |
| | 18.5 hours | 80.386 | 59.684 | 47.977 |
| | 20.0 hours | 83.089 | 67.736 | 56.281 |
| | 21.5 hours | 82.869 | 68.628 | 56.871 |
| III. | 23.0 hours | 89.223 | 67.316 | 60.062 |
| | 24.5 hours | 93.361 | 69.143 | 64.553 |
| | 26.0 hours | 93.803 | 68.489 | 64.245 |
| | 24.5 hours | 93.361 | 69.143 | 64.553 |
| | 26.0 hours | 93.803 | 68.489 | 64.245 |
| | 27.5 hours | 91.442 | 71.105 | 65.020 |
| | 30.0 hours | 92.407 | 66.336 | 61.299 |
| | 31.5 hours | 90.976 | 66.794 | 60.767 |
| | 33.0 hours | 89.471 | 68.618 | 61.393 |
| | 34.5 hours | 88.256 | 71.252 | 62.884 |

It is apparent that the two step method of the present invention wherein the catalyst is subjected to an oxidizing environment and subsequently to a mild reducing environment is significantly more efficient than methods described in the prior art. The application of this invention is particularly useful when the catalyst is being used in the oxydehydrogenation of lower molecular weight carboxylic acids. In this use, the organic feed itself comprises the reducing atmosphere necessary to accomplish the regeneration of the iron/phosphate catalyst. This provides the additional advantage of enabling one to accomplish the regeneration without requiring additional equipment.

Having thus described my invention, I claim:

1. The method of regenerating an iron/phosphate catalyst wherein said iron comprises a mixture of $Fe^{++}$ and $Fe^{+++}$ wherein said catalyst has been partially deactivated by use in oxidative dehydrogenation of a lower molecular weight carboxylic acid comprising the steps of:
    (a) subjecting the catalyst to an extreme oxidizing atmosphere at a temperature of about 350° C. or greater for at least two hours; and
    (b) subjecting the catalyst to a reducing atmosphere at about 350° C. or greater.

2. The method claimed in claim 1 wherein said oxidizing atmosphere comprises oxygen and steam.

3. The method claimed in claim 1 wherein said reducing atmosphere comprises a lower molecular weight carboxylic acid and steam.

4. The method claimed in claim 3 wherein said lower molecular weight carboxylic acid is isobutyric acid.

5. The method of regenerating an iron phosphate catalyst wherein said iron comprises a mixture of $Fe^{++}$ and $Fe^{+++}$ and wherein said catalyst has been deactivated by use in the oxydehydrogenation of a lower molecular weight carboxylic acid comprising:
    (a) subjecting the catalyst to an oxidizing mixture of gases comprising oxygen and steam at a temperature of about 350° C. or more for at least two hours; and
    (b) subjecting the catalyst to a reducing mixture of gases comprising a lower molecular weight organic compound and steam at a temperature of about 350° C. or more.

6. The method as claimed in claim 1, 2, 3, 4 or 5 wherein said iron phosphate catalyst has the formula: $FeP_xMe_yO_z$ wherein Me is one or more of the following elements: Li, Na, K, Rb, Cs, Mg, Ca, Sr and Ba; and
    x is 0.2 to 2.0; and
    y is 0.0 to 2.0; and
    z has a value sufficient to compensate the average valences of the Fe, P and Me in the oxidation states in which these exist in the catalyst.

* * * * *